US007259338B2

(12) United States Patent
Sugioka et al.

(10) Patent No.: US 7,259,338 B2
(45) Date of Patent: Aug. 21, 2007

(54) MEASURING DEVICE

(75) Inventors: Yukio Sugioka, Ritto (JP); Isao Noguchi, Ritto (JP); Teruo Hayakawa, Ritto (JP); Hiroshi Kishimura, Ritto (JP); Kazuhisa Chimura, Ritto (JP); Masayuki Yamanaka, Ritto (JP); Akiyoshi Katsumi, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 194 days.

(21) Appl. No.: 10/995,236

(22) Filed: Nov. 24, 2004

(65) Prior Publication Data

US 2005/0109547 A1 May 26, 2005

(30) Foreign Application Priority Data

Nov. 26, 2003 (JP) ............................. 2003-395398

(51) Int. Cl.
*G01G 13/24* (2006.01)
(52) U.S. Cl. ...................... 177/103; 177/121; 177/123
(58) Field of Classification Search ............. 177/25.18, 177/103–104, 121–123
See application file for complete search history.

(56) References Cited

U.S. PATENT DOCUMENTS

| 3,252,531 A | * | 5/1966 | Mayer et al. ................. 177/69 |
| 4,418,772 A | * | 12/1983 | Fukuda ........................... 177/1 |
| 4,549,619 A | * | 10/1985 | Fujiwara .................. 177/25.18 |
| 4,661,917 A | * | 4/1987 | Haze et al. .................. 700/305 |
| 4,720,961 A | * | 1/1988 | Jordan .......................... 53/502 |
| 4,813,503 A | * | 3/1989 | Douglas et al. ........... 177/25.18 |
| 5,813,195 A | * | 9/1998 | Nielsen et al. ................. 53/443 |
| 5,859,389 A | * | 1/1999 | Tatsuoka et al. .......... 177/25.18 |
| 6,683,261 B2 | * | 1/2004 | Murata et al. ............ 177/25.18 |
| 6,787,712 B2 | * | 9/2004 | Asai et al. ................ 177/25.18 |
| 7,019,224 B2 | * | 3/2006 | Kawanishi et al. ....... 177/25.18 |

FOREIGN PATENT DOCUMENTS

| EP | 1536214 A2 * | 6/2005 |
| JP | 4-69731 U | 6/1992 |
| JP | 9-002401 A | 1/1997 |
| JP | 2000-185719 A | 7/2000 |

\* cited by examiner

*Primary Examiner*—Randy W Gibson
(74) *Attorney, Agent, or Firm*—Global IP Counselors, LLP (57) ABSTRACT

A measuring device includes a first measuring hopper, a first supply portion arranged above the first measuring hopper to supply the objects to the first measuring hopper, a second measuring hopper, a second supply portion fixedly arranged above the second measuring hopper to supply the objects to the second measuring hopper, a plurality of accommodating hoppers circumferentially arranged below the first and second measuring hoppers, and a control portion configured to control the second supply portion and the plurality of accommodating hoppers such that an accommodating hopper discharges the objects only if the total weight of the objects in the accommodating hopper that are discharged from the first and second measuring hoppers is substantially and no smaller than the predetermined weight. The plurality of accommodating hoppers are intermittently circulated such that each of the accommodating hoppers successively receives the objects from the first and second measuring hoppers.

13 Claims, 5 Drawing Sheets

(a) Predetermined values storing portion 42a

| Article name |
|---|
| Article No. |
| Predetermined weight T (100g) |
| First target value T1 (80g) |

(b) History storing portion 42b

|  | H1 | H2 | H3 | H4 | H5 | H6 |
|---|---|---|---|---|---|---|
| 1st measured weight W | 82 | 85 | 75 | 83 | 89 | NO |
| 2nd measured weight ΣW | NO | NO | NO | 98 | 105 | NO |

⇩ Fault discharge
⇩ Acceptable amount discharge

MEASURING DEVICE

BACKGROUND OF THE INVENTION

1. Field of the Invention

The present invention relates to a measuring device for an object or an article.

2. Background Information

Measuring devices have been conceived in which a plurality of hoppers are arranged circumferentially, and operations of supplying, measuring and discharging the objects are performed while circulating these hoppers.

According to the invention of the Japanese Utility Model Publication No. H4-069731 (pp. 4-5, FIG. 1), three operations, i.e., supplying, measuring and discharging the objects are performed intermittently in a circular manner for obtaining objects having a predetermined weight quickly. According to this prior art, however, since the measuring is performed after the objects are supplied, it is difficult to supply objects accurately. Therefore, it is difficult to ensure the accuracy in the weight of objects obtained.

According to the invention of the Japanese Laid-Open Patent Publication No. 2000-185719 (p. 4, FIG. 2), although the intermittent operation is performed likewise, two measuring portions and two supply portions are arranged so that an operation of supplying a large amount of objects is performed together with a supplying operation whereby an error in the weight is corrected. Thereby, objects having a predetermined weight can be obtained quickly with improved weight accuracy. According to this arrangement, however, the supplying and measuring operations are performed at different positions on the circular path, respectively. Therefore, it is difficult to achieve sufficiently high accuracy in supply amount. Furthermore, the weighing device tends to have large sizes.

According to the invention of the Japanese Laid-Open Patent Publication No. H9-002401 (pp. 2-3, FIG. 1), supplying and measuring of a large mount of objects are performed simultaneously, and thereafter, supplying (for the purpose of correcting error in weight) and measuring of a smaller amount of objects are performed simultaneously. Further, these supplying and measuring operations are continuously performed. Thereby, higher accuracy is ensured in weight of objects obtained, and the fast operation is achieved. However, this device requires many measuring devices and many supplying devices for achieving the fast operation. Further, the device must control many devices, and thus requires complicated control. Still furthermore, since the measuring device moves, accurate measuring is difficult as compared with the measuring in a stationary position.

In view of the above, it will be apparent to those skilled in the art from this disclosure that there exists a need for improved measuring devices that overcome the aforementioned problems of the conventional art. This invention addresses this need in the art as well as other needs, which will become apparent to those skilled in the art from this disclosure.

SUMMARY OF THE INVENTION

An object of the invention is to provide a measuring device, of which operation speed, cost and quality are well balanced.

For achieving the above object, a measuring device according to the invention includes a first measuring hopper, a first supply portion, a second measuring hopper, a second supply portion, a plurality of accommodating hoppers, and a supply control portion. The first measuring hopper is configured to measure the objects in the first measuring hopper. The first supply portion is fixedly arranged above the first measuring hopper and configured to supply the objects to the first measuring hopper. The second measuring hopper is configured to measure the objects in the second measuring hopper. The second supply portion is fixedly arranged above the second measuring hopper, and configured to supply the objects to the second measuring hopper. The plurality of accommodating hoppers are circumferentially arranged below the first and second measuring hoppers. The plurality of accommodating hoppers are configured to be intermittently circulated such that each of the accommodating hoppers successively receives the objects from the first and second measuring hoppers. The control portion is operatively coupled to the first and second measuring hoppers, the second supply portion, and the plurality of accommodating hoppers, and configured to control the supply from the second supply portion and the plurality of accommodating hoppers such that an accommodating hopper discharges the objects only if the total weight of the objects in the accommodating hopper that are discharged from the first and second measuring hoppers is substantially and no smaller than the predetermined weight.

Since the supply of a large amount and the supply of a minute amount are performed at different positions, the measuring device can operate fast.

Also, since the supply is performed while performing measurement, supply accuracy can be improved.

Since the supply portion and the measuring hopper are fixedly arranged, high accuracy owing to stationary measurement can be expected. Since the measuring hoppers are small in number, the device can be inexpensive. Also, the supply and measurement are performed in one position so that the device can be small in size.

According to the invention, it is preferable that after the objects are weighed by the first measuring hopper and discharged to one of the accommodating hoppers, measurement of the objects to be discharged to the accommodating hopper is completed by the second measuring hopper before the accommodating hopper is positioned to receive the objects discharged from the second measuring hopper. Owing to this, the supplying and the measuring of the objects can be performed in steps overlapping each other so that the measuring can be performed fast.

According to the invention, it is preferable that the control portion controls supply of objects from the second supply portion by controlling a supply amount per unit time (supply intensity). If the minute supply control were performed by controlling the supply duration, the amount of time necessary to finish supplying the objects would be lengthened, and accordingly the performance of the device will be compromised due to long cycle time of measurement. Therefore, it is preferable in the control of the second supply portion that the control is effected not on the supply duration (number of times of vibrations in the case of a feeder) but on the supply intensity (amplitude in the case of the feeder, and speed in the case of a conveyor).

According to the invention, it is preferable that the control portion sets a first target weight for the first support portion, and controls supply of objects from the first supply portion by controlling one of a supply amount per unit time and a supply duration of the first supply portion. By controlling either or both of the supply intensity and the number of times of vibrations, the performance of the measuring device can be ensured (and a cycle time can be shortened). By using the number of times of vibrations for the control, the measurement values can be stabilized.

According to the invention, it is preferable that the plurality of accommodating hoppers are intermittently circulated on a substantially horizontal plane.

According to the invention, it is preferable that control portion sets a second target weight for the second support portion for each of the accommodating hoppers, and the second target weight is determined based on a difference between the predetermined weight and the weight of objects in the accommodating hopper that are received from the first measuring hopper.

According to the invention, it is preferable that the first target weight is greater than half of the predetermined weight. Each of the accommodating hoppers receives the objects from the first measuring hopper when the accommodating hopper is underneath the first measuring hopper.

According to the invention, it is preferable that each of the accommodating hoppers receives the objects from the second measuring hopper when the accommodating hopper is underneath the second measuring hopper.

According to the invention, it is preferable that the first support portion includes a feeder, and the control portion controls supply of objects from the first supply portion by controlling one of a duration of vibration and a vibration amplitude of the feeder.

According to the invention, it is preferable that the second support portion includes a feeder, and the control portion controls supply of objects from the second supply portion by controlling a vibration amplitude of the feeder.

According to the invention, it is preferable that each of the accommodating hoppers has a gate, and the control portion discharges the objects in an accommodating hopper by opening the gate of the accommodating hopper.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

A measuring device of an embodiment 1 of the invention will now be described with reference to the drawings.

Figure 1:
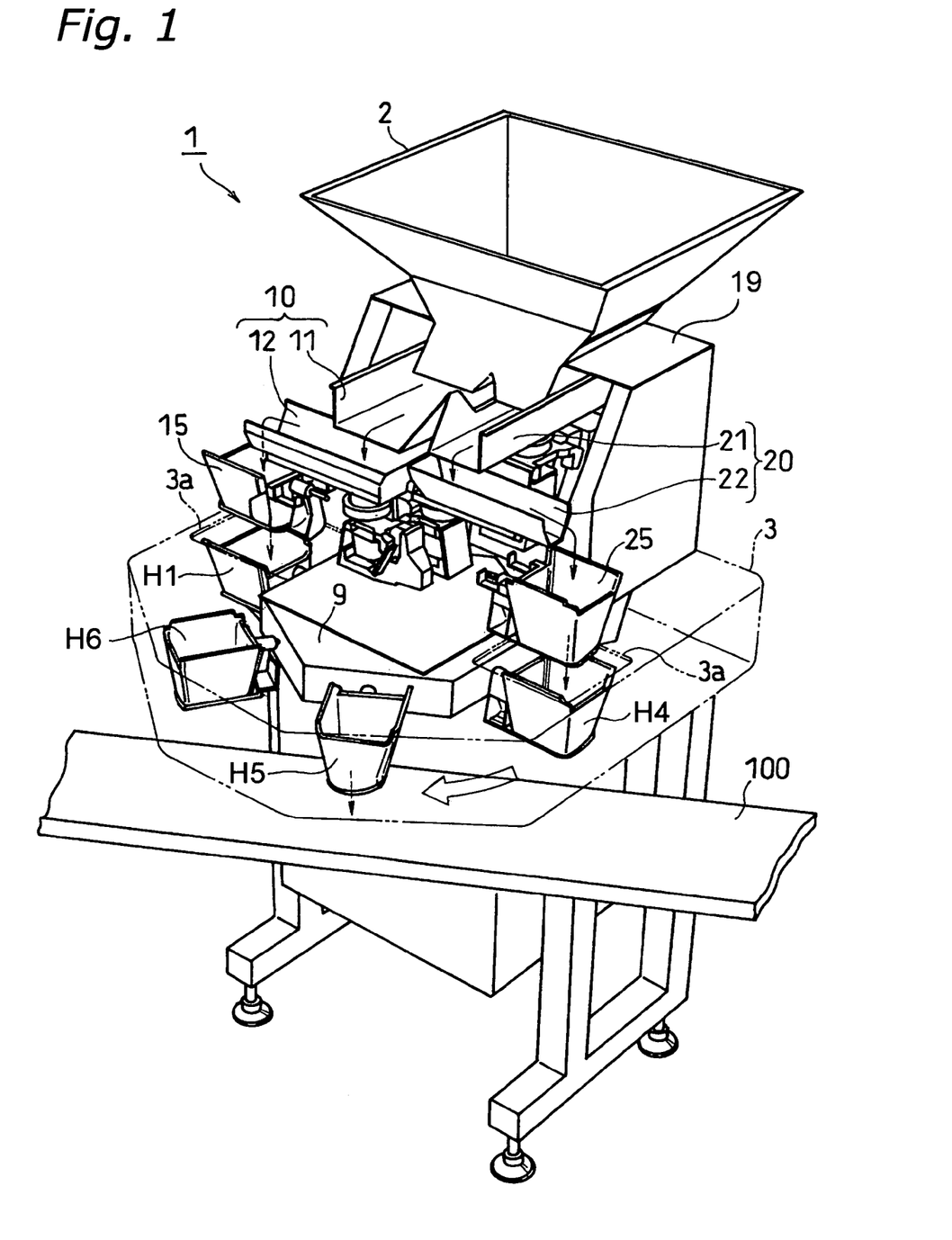
FIG. 1 is a schematic perspective view of a measuring device according to the invention.

FIG. 1 is a schematic view showing a measuring device 1 according to the invention.

As shown in FIG. 1, the measuring device 1 is arranged in a transfer line 100 for obtaining an object $M_T$ having a predetermined weight T, and discharging such object M into a container on the transfer line 100.

The measuring device 1 includes a body 19, a charge hopper 2, first and second supply portions 10 and 20, and first and second measuring hoppers 15 and 25. The charge hopper 2 is arranged above the body 19 of the measuring device 1. The charge hopper 2 accommodates the object M, which is supplied thereto for being weighed. The first and second supply portions 10 and 20 are arranged under the charge hopper 2. The first measuring hopper 15 fixedly attached to the body 19 of the measuring device 1 is arranged downstream from the first supply portion 10, and the second measuring hopper 25 fixedly attached to the body 19 of the measuring device 1 is arranged downstream from the second supply portion 20. The first supply portion 10 supplies the object M that is on the first supply portion 10 to the first measuring hopper 15. The second supply portion 20 supplies the object M that is on the second supply portion 20 to the second measuring hopper 25.

The plurality of accommodating hoppers Hi (H1-H6) are arranged under the first and second measuring hoppers 15 and 25. The cover 3 represented by alternate long and two short dashes line in FIG. 1 is arranged around the plurality of accommodating hoppers Hi for covering the accommodating hoppers Hi. The cover 3 is provided with openings 3a, which are located in portions corresponding to the positions of the measuring hoppers 15 and 25, such that the objects M can be passed to the measuring hoppers 15 and 25 through the opening 3a.

Figure 2:
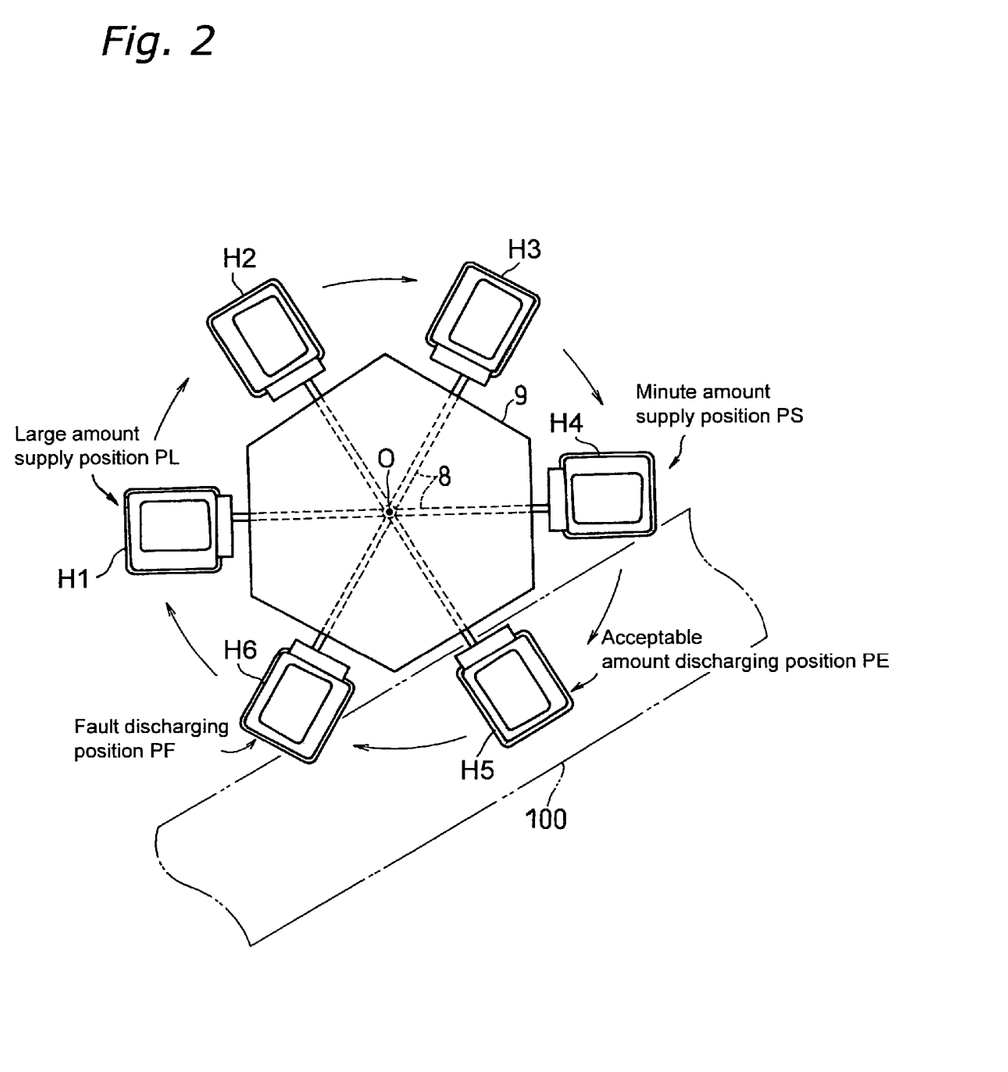
FIG. 2 is a schematic plan showing an arrangement of accommodating hoppers.

As the plurality of accommodating hoppers Hi, FIG. 2 shows six accommodating hoppers H1-H6, which are arranged circumferentially, and are equally spaced from each other. Each accommodating hopper Hi is coupled to a vertical rotation axis O via a coupling rod 8 and a rotary base 9, and is intermittently circulated by a circulation drive motor 6 (see FIG. 3(b)) on a horizontal plane around the rotation axis O. As will be described later, each of the accommodating hoppers H1-H6 is supplied with the object M when the accommodating hopper Hi is positioned at a large amount supply position PL, which corresponds to the first measuring hopper 15. The weight of the object M supplied at the large amount supply position PL is slightly smaller than the predetermined weight T. Thereafter, the accommodating hopper Hi is circulated to a minute amount supply position PS, which corresponds to the second measuring hopper 25, where the object M is supplied again. The weight of the object M supplied to the accommodating hopper Hi at the minute amount supply portion PS is the difference between the predetermined weight T and the weight of the object M supplied at the large amount supply portion PL. Thereby, fast and accurate measuring can be achieved.

Figure 3:
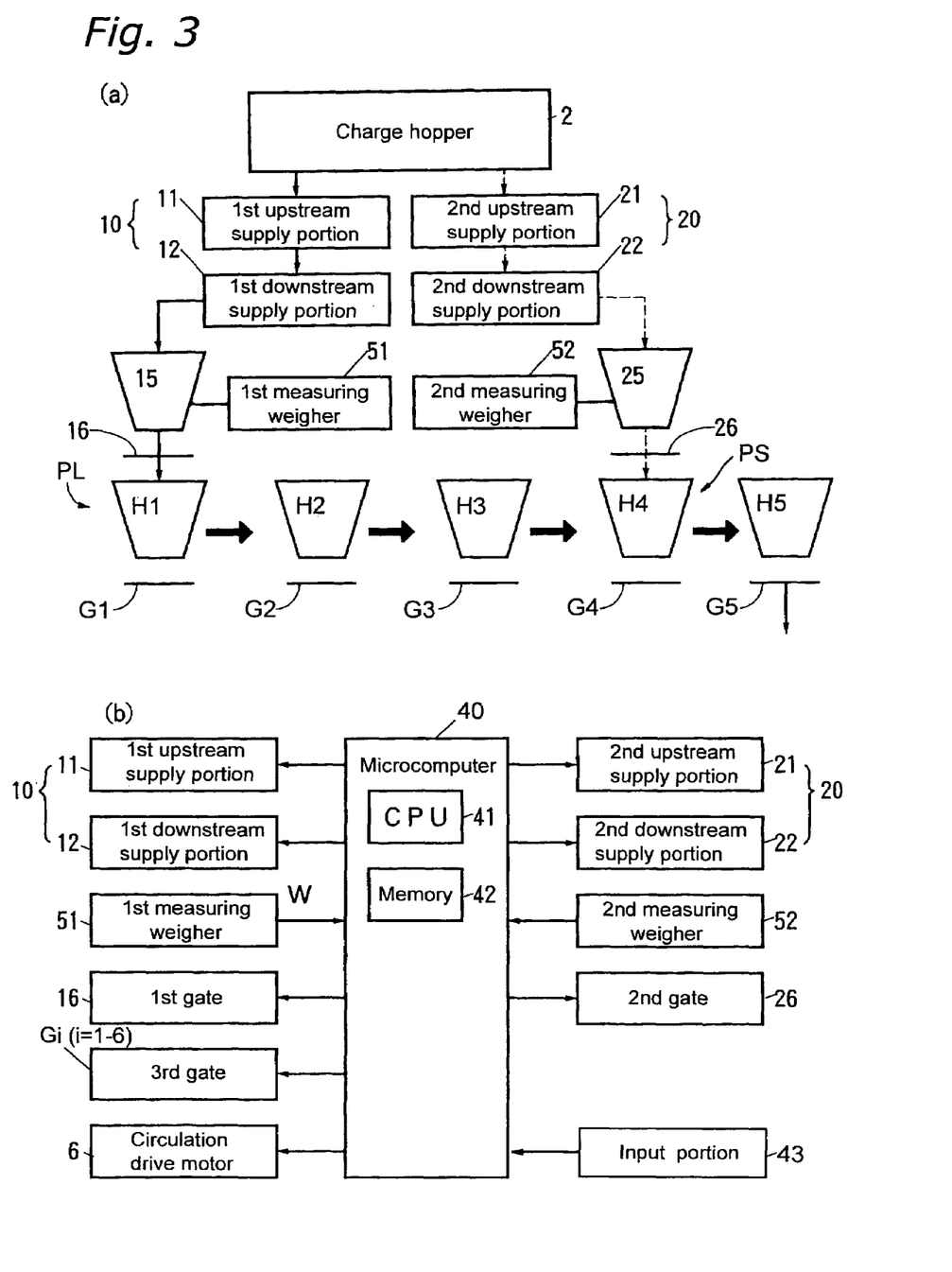
FIG. 3(a) illustrates a concept of the measuring device.
FIG. 3(b) illustrates a control structure of the measuring device.

Referring to FIG. 3(a), the first supply portion 10 is provided for supplying to the first measuring hopper 15 the object M up to a weight that exceeds ½ of the predetermined weight T. The first supply portion 10 is provided with a first upstream supply portion 11 and a first downstream supply portion 12. The second supply portion 20 is provided for supplying to the second measuring hopper 25 the object M up to the weight of the difference, which is determined by subtracting from the predetermined weight T the weight of the object M measured by the first measuring hopper 15. The second supply portion 20 is provided with a second upstream supply portion 21 and a second downstream supply portion 22. Although there is only one each of the first upstream supply portion 11 and the second upstream supply portion 21 in this embodiment, the first supply portion 10 and the second supply portion 20 can have more than one, for instance two or three layers of the first upstream supply portions 11 and the second upstream supply portions 21, which will provide better accuracy.

As shown in FIG. 1, the first upstream supply portion 11 and the first downstream supply portion 12 are wider than the second upstream supply portion 21 and the second downstream supply portion 22, respectively. Thereby, the amount of the object M distributed from the charge hopper 2 to the first supply portion 10 is greater than the amount distributed from the charge hopper 2 to the second supply portion 20.

Figure 5A:
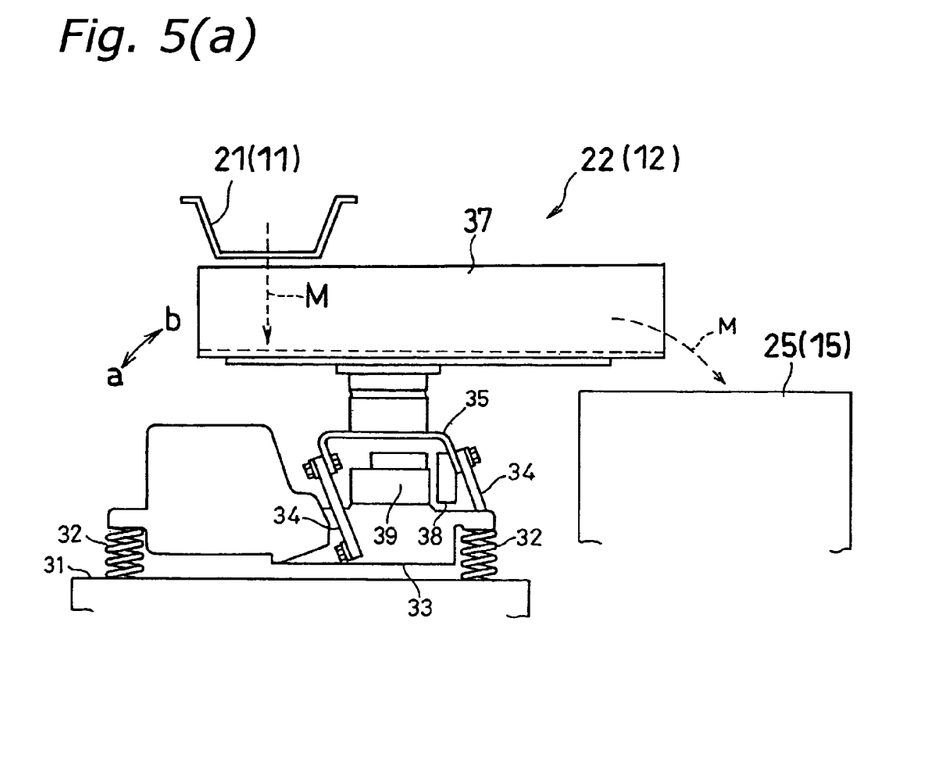
FIG. 5(a) is a side view showing a structure of a supply portion.

The first downstream supply portion 12 and the second downstream supply portion 22 includes, as shown in FIG. 5(a), a feeder base 33, a pair of plate springs 34, a coupling member 35, a trough body 37 and an electromagnetic coil 39. The feeder base 33 is arranged on a support portion 31 via a plurality of coil springs 32. The paired plate springs 34 are fixed to the feeder base 33. The coupling member 35 couples the upper ends of the plate springs 34 together. The coupling member 35 carries the trough body 37 thereon, and allows swing or vibration thereof. The electromagnetic coil 39 is arranged on the feeder base 33 for exerting an electromagnetic force to a magnetic member 38 arranged on the coupling member 35.

When an excitation power supply (not shown) intermittently energizes the electromagnetic coil 39, the first downstream supply portion 12 and the second downstream supply portion 22 repeat the operation by which the magnetic member 38 shifts in a direction of an arrow "a" against an elastic force of the plate springs 34, and the operation by which the trough body 37 floats and shifts in a direction of an arrow "b". Thereby, the trough body 37 repetitively swings or vibrates in the directions of the arrows "a" and "b" shown in FIG. 5(a). One supply operation is performed by multiple times of vibrations so that the object M on the trough body 37 is supplied to the measuring hopper 15 or 25.

The first and second upstream supply portions 11 and 21 respectively have substantially the same structures as the first and second downstream supply portions 12 and 22.

As shown in FIG. 3(a), the first measuring hopper 15 is provided with first measuring weigher 51, which detects the weight of the object M supplied from the first supply portion 10, as well as a first gate 16. The second measuring hopper 25 is provided with second measuring weigher 52, which detects the weight of the object M supplied from the second supply portion 20, as well as a second gate 26. The first and second measuring weighers 51 and 52 provide measured values obtained by measuring the weight of object M to a microcomputer 40.

The microcomputer 40 in FIG. 3(b) is operatively connected to the first and second supply portions 10 and 20, the first and second measuring weighers 51 and 52, the first and second gates 16 and 26, third gates Gi (G1-G6), the circulation drive motor 6 and others via conventional interfaces (not shown). The microcomputer 40 is programmed to selectively control any of the components operatively connected thereto. It will be apparent to those skilled in the art from this disclosure that the precise structure and programs for the microcomputer 40 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The third gates Gi (G1-G6) are provided for each of the accommodating hoppers Hi, as shown in FIG. 3(a), and each can be opened and closed independently of the others.

Microcomputer 40 includes a CPU (control portion) 41 and a memory 42. The microcomputer 40 can also include other conventional components such as an input interface circuit, an output interface circuit, and storage devices such as a ROM (Read Only Memory) device and a RAM (Random Access Memory) device. The memory 42 has a predetermined values storing portion 42a shown in FIG. 4(a) and a history storing portion 42b shown in FIG. 4(b). In addition, the microcomputer 40 receives from an input portion 43 data concerning the object M, for example, the predetermined weight T or the first predetermined weight T1 that will be described later. The input portion may be a manual input device attached to the measuring device 1, such as a key board or a display with touch panels, or may be an adapter which receives the data sent from a device different from the measuring device 1.

Figure 4:
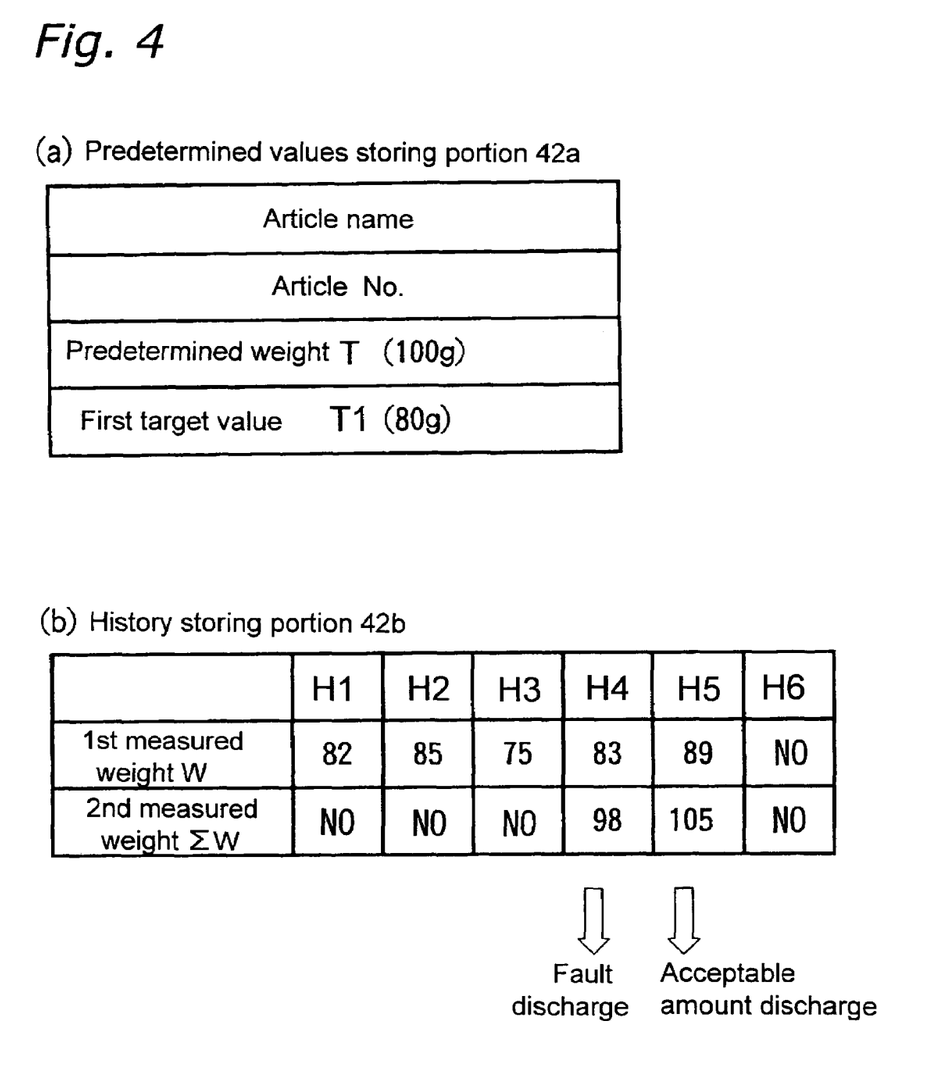
FIG. 4 illustrates storage contents of a memory.

As shown in FIG. 4(a), the predetermined values storing portion 42a stores an article name, an article number, the predetermined weight T and a first target value T1 for each article (object) M. The first target value T1 is a target weight of the object M to be supplied from the first supply portion 10 to the first measuring hopper 15. The first target value T1 is greater than half (½) of the predetermined weight T, and is, for example, in a range between about 70% and about 90% of the predetermined weight T.

The CPU 41 calculates a second target value T2 for controlling the second supply portion 20. The second target value T2 is obtained by subtracting a first measured value W, which is obtained by actual measurement at the first measuring hopper 15 (or the first measuring weigher 51 operatively connected to the first measuring hopper 15), from the predetermined weight T as represented by the following formula (1).

$$T2 = T - W \qquad \text{Formula 1}$$

As illustrated in FIG. 4(b), the history storing portion 42b stores the first measured weight W obtained from the actual measurement by the first measuring weigher 51 as well as a second measured weight ΣW, which is a sum of the measured value obtained by the actual measurement at the second measuring weigher 52 and the first measured value W, for each of the accommodating hoppers H1-H6.

The CPU 41 controls operations of various devices and portions connected to the microcomputer 40 based on the contents stored in the memory 42 and outputs from the measuring weighers 51 and 52. The control and operation will now be described in detail. The following description will be given on an example, in which the predetermined weight T is 100 grams and the first target value T1 is 80 grams.

As described below, each accommodating hopper Hi is supplied with object M from the first measuring hopper 15, and then is supplied with object M from the second measuring hopper 25. First, the first supply portion 10 in FIG. 3(a) performs the supply operation to supply the object M to the first measuring hopper 15. The weight of the object M supplied to the first measuring hopper 15 is measured by the first measuring weigher 51 to obtain the first measured weight W as the object M is supplied to the first measuring hopper 15. The first measured weight W is sent to the CPU 41. Based on the output from the first measuring weigher 51, the CPU 41 performs the feedback control of the supply amount from the first supply portion 10 per unit time (supply intensity) or the supply duration (length of times of vibrations) from the first supply portion 10, such that the first measured weight W of the object M supplied to the first measuring hopper 15 approaches the predetermined first target value T1 of 80 grams.

Figure 5B:
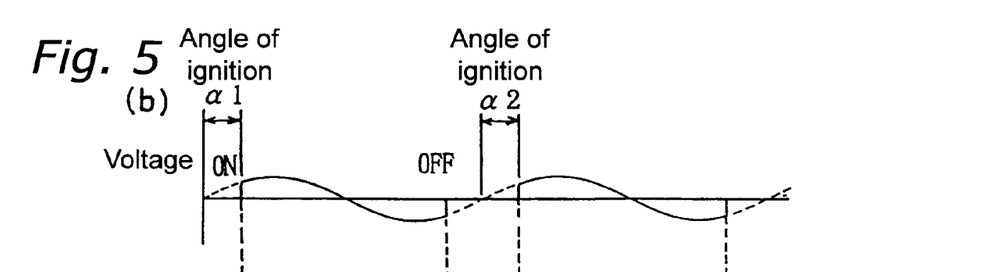
FIGS. 5(b) and 5(c) are characteristic diagrams illustrating by way of example a control manner of the supply portion.
Figure 5C:
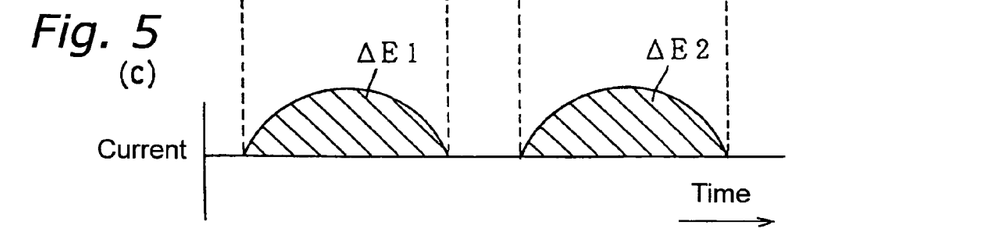

For controlling the supply amount per unit time, ON-OFF control is effected on the excitation power supply, which energizes the electromagnetic coil 39 (see FIG. 5(a)) of the first supply portion 10. Thus, the control is effected on the angles of ignition $\alpha i$ ($\alpha 1$, $\alpha 2$, ... ) in FIG. 5(b). Thereby, vibration energies $\Delta Ei$ (E1, E2, ... ), which is represented as the hatched portions in FIG. 5(c), are controlled such that the amplitude of the trough body 37 during one supply operation is adjusted. By setting the number of times of vibrations in one supply operation in advance, and then changing the amplitude as described above, the supply amount per unit time from the first supply portion 10 can be controlled without changing the supply duration (or the number of times of vibrations). Such control provides a stable cycle time, and thus can achieve fast measurement.

On the other hand, when the supply duration is to be controlled, the amplitude of the trough body 37 is kept constant, and only the number of times of vibrations is changed. According to this control, the cycle time may become unstable to a certain extent, but the supply amount of the object M has a linearity with respect to the supply duration (which corresponds to the number of times of vibrations) so that the measured value of the object M obtained by the first measuring hopper 15 can be stable.

When the measured value of the first measuring weigher 51 attains approximately the first target value T1, the CPU 41 stops the supply operation of the first supply portion 10. The CPU 41 stores the measured value of the object M that has been supplied to the first measuring hopper 15 as the first measured value W in the history storing portion 42b. In this operation, as shown in FIG. 4(b), the history storing portion 42b stores the first measured value W so as to correspond to the accommodating hopper Hi that is located in the large amount supply position PL as shown in FIG. 2. Thereafter, the CPU 41 opens the first gate 16 shown in FIG. 3(a), and discharges the object M from the first measuring hopper 15 into the accommodating hopper Hi.

Subsequently, the CPU 41 closes the first gate 16, and restarts the supply operation of the first supply portion 10. Also, the CPU 41 drives the circulation drive motor 6 in FIG. 3(b) to circulate intermittently and clockwise each accommodating hopper Hi in FIG. 2 by one pitch (a predetermined angle: 60° in the example of FIG. 2). The measurement of the object M and circulation of the accommodating hopper Hi are repeated in this manner. When the accommodating hopper Hi accommodating the object M that was measured by the first measuring hopper 15 moves to the minute amount supply position PS, which is underneath the second measuring hopper 25 in FIG. 3(a), the second measuring hopper 25 supplies to the accommodating hopper Hi the object by of a minute amount of the second target value T2, which corresponds to the difference between the first measured weight W and the predetermined target weight T.

The CPU 41 subtracts the first measured value W measured by the first measuring hopper 15 from the predetermined weight T to calculate the second target value T2 corresponding to the difference. The CPU 41 controls the supply operation of the second supply portion 20 based on the output of the second measuring hopper 25 such that the object M is supplied to the second measuring hopper 25 shown in FIG. 3(a) from the second measuring hopper 25 up to the amount of the second target value T2. Thus, the second measuring weigher 52 measures the weight of the object M into the second measuring hopper 25 as the object M is supplied to the second measuring hopper 25, and feeds back the measured weight of the object M in the second measuring hopper 25 to the CPU 41. The CPU 41 performs the feedback control of the supply amount per unit time (supply intensity) of the second supply portion 20 based on the measured weight of the object M measured by the second measuring weigher 52.

Here, although it is possible to control the supply duration (which corresponds to the number of times of vibrations) of the minute-amount supply, such control increases the amount of time required to complete the supply operation, and thus tends to lower the whole performance of the measuring device 1 by lengthening the cycle time of measurement. In this embodiment, therefore, the supply intensity (amplitude), instead of the supply duration (which corresponds to the number of times of vibrations) of the supply operation of the second supply portion 20 is controlled in order to reduce the cycle time. In the mean time, since the object M is measured during the supply operation, it is possible to maintain accuracy in the weight of the object M to be supplied by the second measuring hopper 25.

Once the weight of the object M supplied to the second measuring hopper 25 reaches a point where the weight of the object M in the second measuring hopper 25 is still below the second target value T2 but will exceed with one more vibration, the CPU 41 stops the supply operation of the second supply portion 20. As the second measured weight $\Sigma W$, the CPU 41 stores a sum of the measured value of the object M that has been supplied to the second measuring hopper 25, and the first measured value W stored in the history storing portion 42b. In this operation, as shown in FIG. 4(b), the second measured weights $\Sigma W$ are stored so as to correspond to each of the accommodating hoppers Hi. The CPU 41 opens the second gate 26 in FIG. 3(a), and discharges the object M from the second measuring hopper 25 into the accommodating hopper H4.

According to the above structure, since the first and second measuring hoppers 15 and 25 are located in a vertical position different from that of the accommodating hoppers Hi, the measuring device 1 can have a small structure. Since the first and second measuring hoppers 15 and 25 are fixedly arranged, the first and second measuring hoppers 15 and 25 can perform stationary measurement of the object M supplied thereto. This can improve the measuring accuracy.

The CPU 41 performs the control such that the second measuring hopper 25 completes the measurement before the accommodating hopper Hi that has the object M measured by the first measuring hopper 15 reaches the minute amount supply position PS, where the accommodating hopper Hi can receive the object M discharged from the second measuring hopper 25. Owing to the above control, the supply and the measurement of the object M can be performed at the first and second measuring hoppers 15 and 25 in an overlapping manner, such that the measurement can be performed fast and efficiently.

When the second measured weight $\Sigma W$ is calculated, the CPU 41 makes a comparison-between the second measured weight $\Sigma W$ and the predetermined weight T for each accommodating hopper Hi, and determines whether or not the second measured weight $\Sigma W$ of the accommodating hopper Hi is acceptable relative to the predetermined weight T. For example, in the accommodating hopper H5 shown in FIG. 4(b), the second measured weight ΣW is acceptable (i.e., second measured weight ΣW≧predetermined weight T). In this case, when the accommodating hopper H5 reaches an acceptable amount discharging position PE shown in FIG. 2, the accommodating hopper H5 opens the third gate G5 to discharge the object M accommodated in the accommodating hopper H5 into a container on a transporting line 100. Conversely, in the accommodating hopper H4 shown in FIG. 4(b), the second measured weight ΣW is not acceptable (i.e., second measured weight ΣW<predetermined weight T). In this case, the accommodating hopper H4 does not discharge the object M in the correct amount discharging position PE shown in FIG. 2. Instead, when the accommodating hopper H4 reaches a fault discharging position PF, a third gate G4 opens to remove the object M accommodated in the accommodating hopper H4 from the line.

According to the measuring device 1 as described above, the respective steps described above are successively performed while intermittently circulating the accommodating hoppers Hi so that fast and efficient measuring of the object M can be performed.

ALTERNATIVE EMBODIMENTS

In the above structure, the plurality of accommodating hoppers Hi may be intermittently circulated on an inclined plane instead of the horizontal plane.

The plurality of accommodating hoppers Hi may be intermittently circulated on a vertical plane instead of the horizontal plane. For example, the measuring hoppers 15 and 25 may be fixedly arranged, and inclined chutes may be arranged for transferring the object M from the measuring hoppers 15 and 25 to the accommodating hoppers Hi. Thereby, the accommodating hoppers Hi can be configured to circulate on a vertical plane the way a Ferris wheel circulates.

Although the embodiments have been described with reference to the drawings, it will be understood by those skilled in the art that various changes and modifications can be performed within the spirit and scope of the present invention.

For example, the number of the accommodating hoppers is not restricted to six, and the plurality of accommodating hoppers may have more or less than six accommodating hoppers.

The first and second supply portions do not need to be electromagnetic feeders as in the above embodiment. Instead, the first and second supply portions may be conveyors. In this case, the supply intensity can be controlled by changing the speed of the conveyor.

Alternatively, the second supply portion can be controlled by adjusting the supply duration.

It can be understood to those skilled in the art that these changes and modifications are within the scope of the present invention limited only by claims.

The invention can be applied to measuring devices for obtaining objects having a predetermined weight.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-395398. The entire disclosure of Japanese Patent Application No. 2003-395398 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A measuring device comprising:
   a first measuring hopper configured to measure objects in the first measuring hopper;
   a first supply portion fixedly arranged above the first measuring hopper and configured to supply objects to the first measuring hopper;
   a second measuring hopper configured to measure objects in the second measuring hopper;
   a second supply portion fixedly arranged above the second measuring hopper, and configured to supply objects to the second measuring hopper;
   a plurality of accommodating hoppers circumferentially arranged below the first and second measuring hoppers, the plurality of accommodating hoppers equally spaced from each other, the plurality of accommodating hoppers being configured to be intermittently circulated such that each of the accommodating hoppers successively receives objects from the first measuring hopper at a large amount supply position, and receives objects from the second measuring hopper at a minute amount supply position, at least one accommodating hopper being arranged between the accommodating hopper at the large amount supply position and the accommodating hopper at the minute amount supply position; and
   a control portion operatively coupled to the first and second measuring hoppers, the first and the second supply portions, and the plurality of accommodating hoppers and configured to control the supply from the second supply portion and the plurality of accommodating hoppers such that an accommodating hopper discharges objects only if the total weight of the objects in the accommodating hopper that are discharged from the first and second measuring hoppers is substantially and no smaller than a predetermined weight;
   wherein the control portion causes the first measuring portion to supply objects at the large amount supply position having a weight that is greater than half of but less than the predetermined weight, and causes the second measuring portion to supply objects at the minute amount supply position having a weight that is substantially equal to the difference between the weight of the objects received at the large amount supply position and the predetermined weight.

2. The measuring device according to claim 1, wherein after the objects are weighed by the first measuring hopper and discharged to one of the accommodating hoppers, measurement of the objects to be discharged to the accommodating hopper is completed by the second measuring hopper before the accommodating hopper is positioned to receive the objects discharged from the second measuring hopper.

3. The measuring device according to claim 1, wherein the control portion controls supply of objects from the second supply portion by controlling a supply amount per unit time.

4. The measuring device according to claim 1, wherein the control portion sets a first target weight for the first supply portion, and
the control portion controls supply of objects from the first supply portion by controlling one of a supply amount per unit time and a supply duration of the first supply portion.

5. The measuring device according to claim 1, wherein the plurality of accommodating hoppers are intermittently circulated on a substantially horizontal plane.

6. The measuring device according to claim 1, wherein the control portion sets a second target weight for the second supply portion for each of the accommodating hoppers, and
the second target weight being determined based on a difference between the predetermined weight and the weight of objects in the accommodating hopper that are received from the first measuring hopper.

7. The measuring device according to claim 4, wherein the first target weight is greater than half of the predetermined weight.

8. The measuring device according to claim 1, wherein each of the accommodating hoppers has a gate, and
the control portion discharges the objects in an accommodating hopper by opening the gate of the accommodating hopper.

9. The measuring device according to claim 1, wherein each of the accommodating hoppers receives the objects from the first measuring hopper when the accommodating hopper is underneath the first measuring hopper.

10. The measuring device according to claim 1, wherein each of the accommodating hoppers receives the objects from the second measuring hopper when the accommodating hopper is underneath the second measuring hopper.

11. The measuring device according to claim 4, wherein the first supply portion includes a feeder, and
the control portion controls supply of objects from the first supply portion by controlling one of a duration of vibration and a vibration amplitude of the feeder.

12. The measuring device according to claim 6, wherein the second supply portion includes a feeder, and
the control portion controls supply of objects from the second supply portion by controlling a vibration amplitude of the feeder.

13. A measuring device comprising:

a first measuring hopper configured to measure objects in the first measuring hopper;

a first supply portion fixedly arranged above the first measuring hopper and configured to supply objects to the first measuring hopper;

a second measuring hopper configured to measure objects in the second measuring hopper;

a second supply portion fixedly arranged above the second measuring hopper, and configured to supply objects to the second measuring hopper by means of vibration;

a plurality of accommodating hoppers circumferentially arranged below the first and second measuring hoppers, the plurality of accommodating hoppers equally spaced from each other, the plurality of accommodating hoppers being configured to be intermittently circulated such that each of the accommodating hoppers successively receives objects from the first measuring hopper at a large amount supply position, and receives objects from the second measuring hopper at a minute amount supply position, at least one accommodating hopper being arranged between the accommodating hopper at the large amount supply position and the accommodating hopper at the minute amount supply position; and a control portion operatively coupled to the first and second measuring hoppers, the first and the second supply portions, and the plurality of accommodating hoppers, and configured to control the supply of objects from the second supply portion by controlling the amplitude of vibrations applied to the second supply portion, and configured to control the plurality of accommodating hoppers such that an accommodating hopper discharges the objects only if the total weight of the objects in the accommodating hopper that are discharged from the first and second measuring hoppers is substantially and no smaller than a predetermined weight;

wherein the control portion causes the first measuring portion to supply objects at the large amount supply position having a weight that is greater than half of but less than the predetermined weight, and causes the second measuring portion to supply objects at the minute amount supply position having a weight that is substantially equal to the difference between the weight of the objects received at the large amount supply position and the predetermined weight.

* * * * *